US012087107B2

(12) United States Patent
Bapat et al.

(10) Patent No.: US 12,087,107 B2
(45) Date of Patent: Sep. 10, 2024

(54) AIRCRAFT GROUND REFUELING MANAGEMENT SYSTEM

(71) Applicant: EATON INTELLIGENT POWER LIMITED, Dublin (IE)

(72) Inventors: Aditee Bapat, Pune (IN); Amit Joshi, Pune (IN); Amit Baddi, Irvine, CA (US); Parag More, Pune (IN); Bhupesh Jingar, Wadgaon Sheripune (IN); Jaspal Rawat, Irvine, CA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 227 days.

(21) Appl. No.: 17/714,694

(22) Filed: Apr. 6, 2022

(65) Prior Publication Data

US 2022/0327500 A1 Oct. 13, 2022

(30) Foreign Application Priority Data

Apr. 8, 2021 (IN) .............................. 202111016618

(51) Int. Cl.
| | |
|---|---|
| *B64F 1/28* | (2006.01) |
| *G06Q 50/06* | (2012.01) |
| *G07C 5/00* | (2006.01) |
| *G07C 5/06* | (2006.01) |
| *G07C 5/08* | (2006.01) |

(52) U.S. Cl.
CPC .............. *G07C 5/0825* (2013.01); *B64F 1/28* (2013.01); *G06Q 50/06* (2013.01); *G07C 5/008* (2013.01); *G07C 5/06* (2013.01); *G07C 5/0808* (2013.01)

(58) Field of Classification Search
USPC ............................................. 244/135; 700/96
See application file for complete search history.

(56) References Cited

U.S. PATENT DOCUMENTS 2,769,575 A * 11/1956 Harman ................... B64F 1/28
242/390.8
6,975,964 B2 * 12/2005 Reichler ................ B67D 7/085
702/182

(Continued)

OTHER PUBLICATIONS

Chesser, J. B., J. V. Draper, and F. G. Pin. Robotics and Automation for Flight Deck Aircraft Servicing. No. ORNL/TM-13717. Oak Ridge National Lab.(ORNL), Oak Ridge, TN (United States), 1999. (Year: 1999).*

(Continued)

*Primary Examiner* — Gurkanwaljit Singh
(74) *Attorney, Agent, or Firm* — MERCHANT & GOULD P.C.

(57) ABSTRACT

An aircraft ground refueling management system of the present disclosure utilizes various components already existing in an aircraft ground refueling vehicle to characterize and track, in real time, events of an aircraft refueling operation. The components include a fuel meter, a fuel delivery deadman sensor, a fuel nozzle sensor and a ground refueling vehicle brake sensor. Data from these components in combination with data provided by a mobile computing device that is integral to the refueling operation provide the data points to determine the amount of time elapsed for each event of the refueling operation. Knowledge of each event of the refueling operation provides the opportunity for identifying where time spent can be reduced.

20 Claims, 17 Drawing Sheets

(56) References Cited

U.S. PATENT DOCUMENTS

| | | | | |
|---|---|---|---|---|
| 8,055,526 B2* | 11/2011 | Blagg | ............... | G06Q 10/06311 |
| | | | | 705/7.14 |
| 8,666,586 B2* | 3/2014 | Portocalis | ............... | G06Q 10/06 |
| | | | | 701/29.3 |
| 10,318,904 B2* | 6/2019 | Johnson | ................. | G06Q 50/14 |
| 2005/0267673 A1 | 12/2005 | Blagg et al. | | |
| 2008/0065449 A1* | 3/2008 | Blagg | ............... | G06Q 10/06311 |
| | | | | 705/7.13 |
| 2011/0232801 A1 | 9/2011 | Watkins et al. | | |
| 2012/0158609 A1* | 6/2012 | Dickman | ................ | G06Q 10/08 |
| | | | | 705/335 |
| 2012/0173072 A1 | 7/2012 | Portocalis et al. | | |
| 2012/0284075 A1 | 11/2012 | Blagg et al. | | |
| 2013/0007650 A1 | 1/2013 | Van Hoy et al. | | |
| 2017/0323274 A1* | 11/2017 | Johnson | ............... | G05B 13/041 |

OTHER PUBLICATIONS

Ruamchat, Kanon, Natcha Thawesaengskulthai, and Chaipong Pongpanich. "A method of prioritizing quality improvement in aviation refuelling services at airport." Advances in Mechanical Engineering 9.6 (2017) (Year: 2017).*

Extended European Search Report for European Patent Application No. 22167286.8 mailed Jul. 18, 2022, 9 pages.

"Dead man's switch", Wikipedia, 1-9 (Feb. 3, 2021); retrieved from the Internet: https://en.wikipedia.org/w/index.php?title=Dead_man's_switch&oldid=1004552642.

* cited by examiner

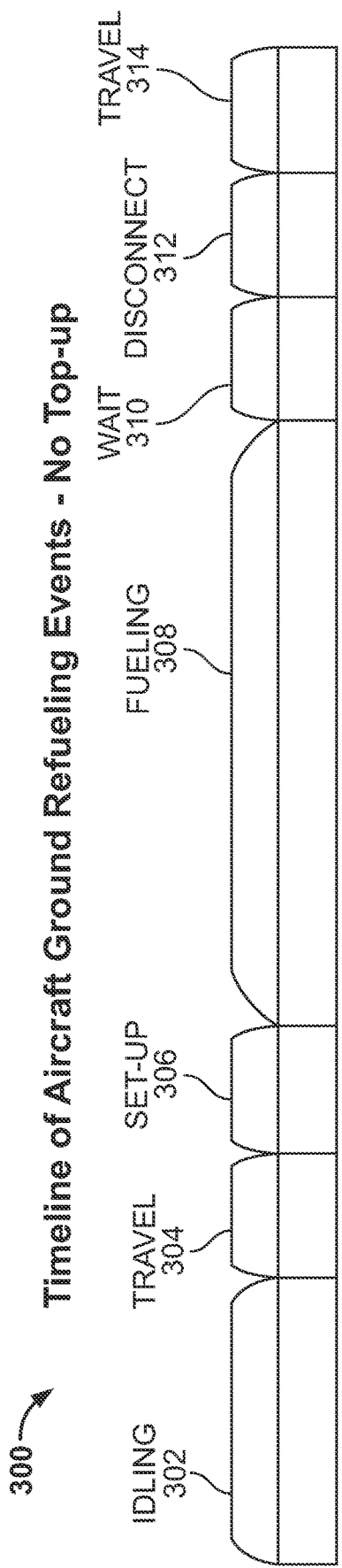

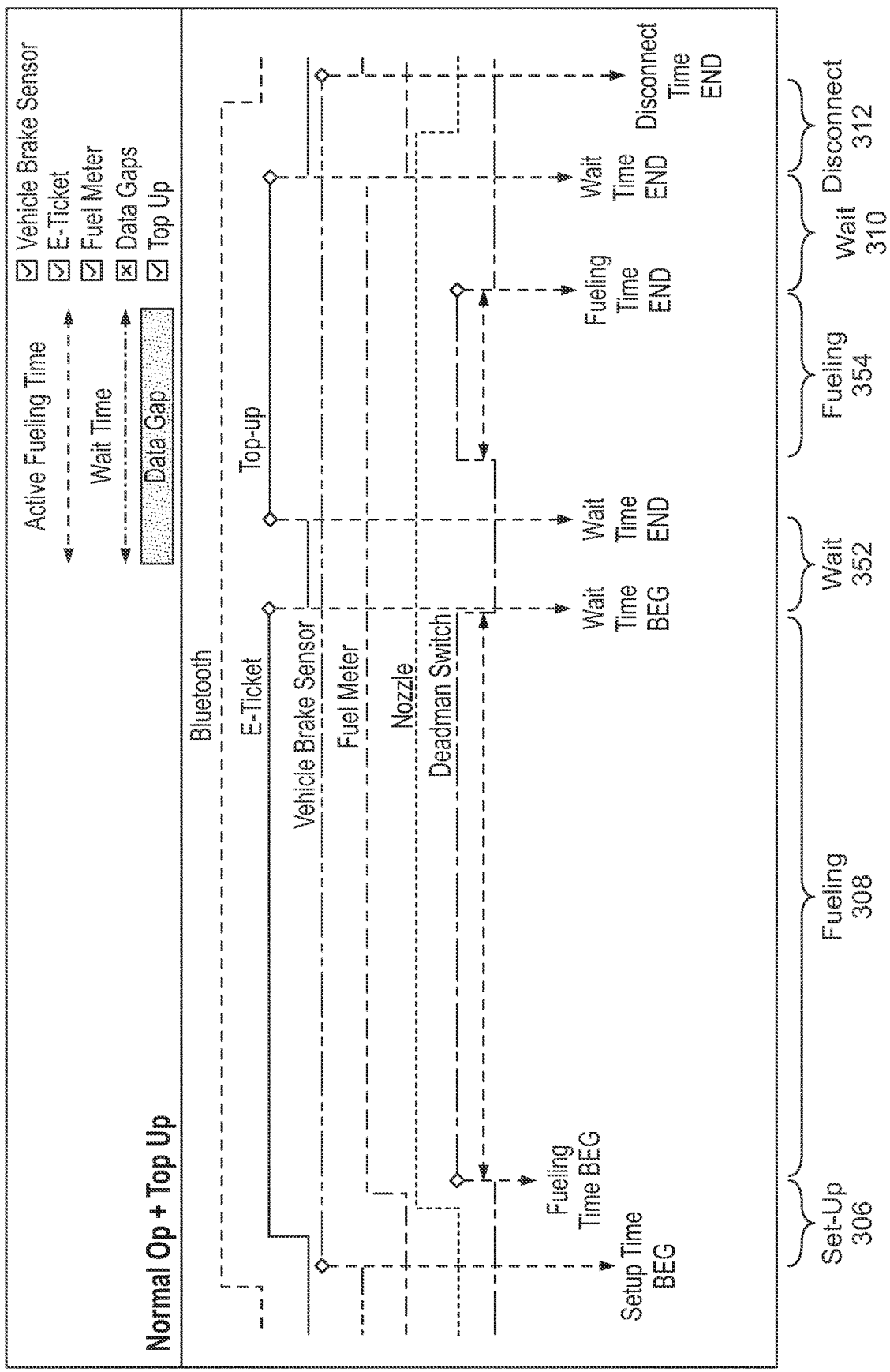

If the data gap is large (>10min) then event is assumed to be two separate events.
Events will be updated based on GFE eTicket data.

1st Event:
Setup Time    From: Truck Brake Interlock ON    To: 1st Deadman ON
Fueling Time    From: 1st Deadman ON    To: Last Data entry
Disconnect Time    Not Available
Wait Time    Not Available

2nd Event:
Setup Time    Not Available
Fueling Time    From: 1st Deadman ON    To: Last Deadman Off
Disconnect Time    From: 1st Deadman Off    To: eTicket
Wait Time    From: eTicket    To: Truck Brake Interlock Off

Post Processing:
Events will be merged if needed based on Start and End event information which is available in the eTicket
(eTicket data will be available which in independent of eTicket service).

FIG. 5F (Cont.)

AIRCRAFT GROUND REFUELING MANAGEMENT SYSTEM

CROSS-REFERENCE TO RELATED APPLICATION

This application claims the benefit of Indian Provisional Patent Application No. 202111016618, filed on Apr. 8, 2021, the disclosure of which is incorporated herein by reference in its entirety.

FIELD OF THE DISCLOSURE

The present disclosure is directed to aircraft ground refueling and, more specifically, to an aircraft ground refueling management system.

BACKGROUND

Aircraft ground refueling operations are generally tracked through manual entries of start and end times for one or more events of each refueling operation that is provided by a refueling vehicle. These events can include, for example, a set-up event where the refueling vehicle, positioned proximate an aircraft, is readied for refueling and a fueling event where the previously set-up refueling vehicle actually delivers (e.g. pumps) fuel from the vehicle to an aircraft. However, manual notation can often lead to errors or omissions in data making the data unreliable for further processing and analysis.

SUMMARY

An aircraft ground refueling management system and method of the present disclosure utilizes components already present in an aircraft ground refueling vehicle to track, in real time, events of an aircraft refueling operation.

The aircraft ground refueling management system can also track, in real time, a location of the aircraft ground refueling vehicle and a quantity of fuel delivered by the aircraft ground refueling vehicle. The aircraft ground refueling management system and method utilizes the tracked data to improve aircraft ground refueling operations including identifying operational events where time durations can be reduced, identifying potential issues with refueling equipment of a refueling vehicle, identifying potential issues with a specific refueling vehicle operator, refueling vehicle fleet management including establishing a fleet fueling schedule based on historical refueling data and current fleet status.

An aspect of the present disclosure is directed to a method of and/or a system for defining fueling events of an aircraft ground refueling operation. The method includes receiving, in real-time from a digital controller of an aircraft ground refueling vehicle, a communication indicating an ON/OFF status of a vehicle brake sensor of the aircraft ground refueling vehicle, an ON/OFF status of a nozzle sensor of the aircraft refueling vehicle, and an ON/OFF status of a deadman fuel switch of the aircraft refueling vehicle. The method further includes defining a first ground refueling event time period as between a first start marker comprising an ON status of the vehicle brake sensor and a first end marker comprising a subsequent first instance of an ON status of the deadman fuel switch. The method further includes defining a second ground refueling event time period as between a second start marker comprising the subsequent first instance of an ON status of the deadman fuel switch and second end marker comprising a subsequent last instance of an OFF status of the deadman fuel switch.

Additionally, the method comprises determining a first amount of time spent in the first ground refueling event time period based on the first start marker and first end marker and creating a historical log of the first amount of time spent relative to the aircraft ground refueling vehicle as well as determining a second amount of time spent in the second ground refueling event time period based on the second start marker and second end marker and creating a historical log of the second amount of time spent relative to the aircraft ground refueling vehicle. The method also includes analyzing the historical log of first and second amount of time spent to select at least one of the first and second ground refueling events as an event in which the amount of time should be reduced and generating an output representative of the analysis.

The Summary is not intended to describe each embodiment or every implementation. A more complete understanding will become apparent and appreciated by referring to the Detailed Description and Claims in conjunction with the accompanying drawings.

BRIEF DESCRIPTION OF THE DRAWINGS

FIG. 3A is a timeline illustrating the events of an example aircraft ground refueling operations.

FIG. 3B is a timeline illustrating the events of an example aircraft ground refueling operations that additionally includes a top-up operation.

FIG. 4B is a signal graph illustrating the data points used to characterize the events of FIG. 3B.

DETAILED DESCRIPTION

An aircraft ground refueling management system of the present disclosure utilizes various components already existing in an aircraft ground refueling vehicle to characterize and track, in real time, events of an aircraft refueling operation. The components include a fuel meter, a fuel delivery deadman sensor, a fuel nozzle sensor and a ground refueling vehicle brake sensor. Data from these components in combination with data provided by a mobile computing device that is integral to the refueling operation provide the data points to determine the amount of time elapsed for each event of the refueling operation. Knowledge of each event of the refueling operation provides the opportunity for identifying where time spent can be reduced.

In certain embodiments, the aircraft ground refueling management system also tracks, in real time, a location of the aircraft ground refueling vehicle and/or a quantity of fuel delivered by the aircraft ground refueling vehicle as determined by the on-board fuel meter. The aircraft ground refueling management system utilizes the tracked data to improve aircraft ground refueling operations including identifying operational events where time durations can be reduced, identifying potential issues with refueling equipment of a refueling vehicle, identifying potential issues with a specific refueling vehicle operator, refueling vehicle fleet management including establishing a fleet fueling schedule based on historical refueling data and current fleet status.

Figure 1A:
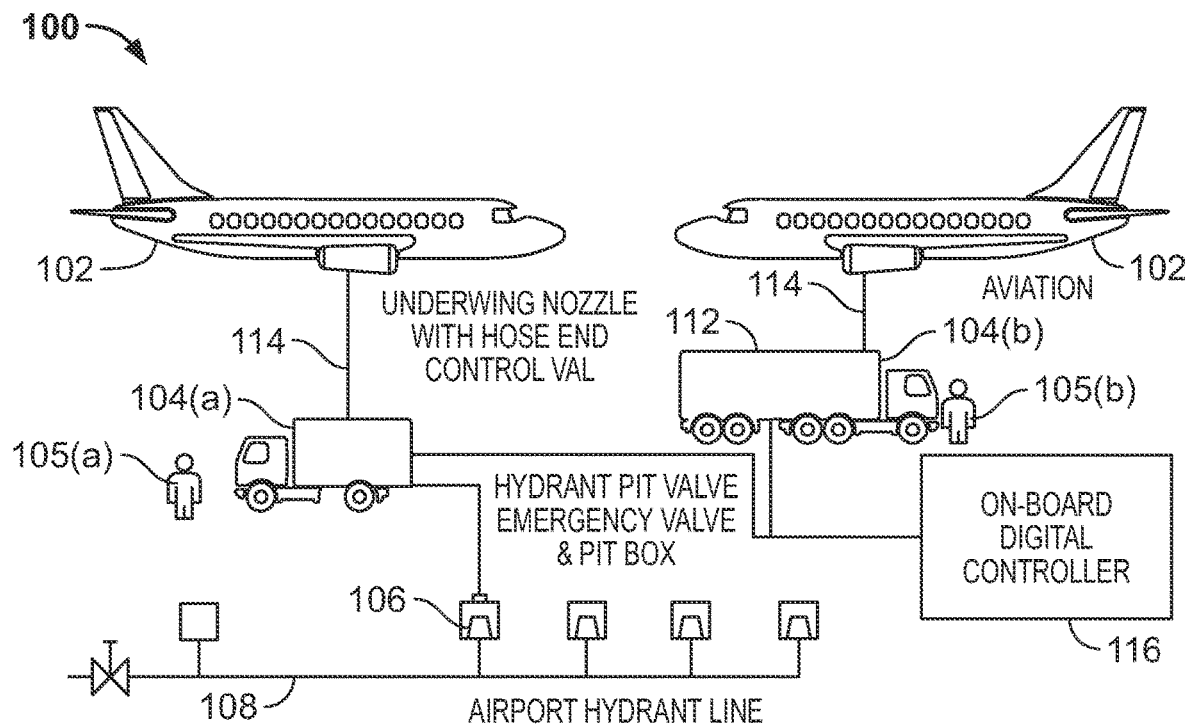
FIG. 1A illustrates an example of an aircraft ground refueling environment.

FIG. 1A illustrates an example of an aircraft ground refueling environment 100. As shown aircraft 102 are refueled by a refueling vehicle 104 that can comprise a hydrant dispenser 104(a) or a mobile refueler 104(b), each of which is operated by a respective operator 105(a), 105(b). The hydrant dispenser 104(a) is directly coupled, via a hydrant valve 106, to an airport hydrant line 108, while the mobile refueler 104(b) carries all fuel for dispensing in a tank 112. Each of the hydrant dispenser 104(a) and mobile refueler 104(b) are coupled to their respective aircraft 102 for refueling via a fuel hose 114 having a nozzle. Each refueling vehicle 104 is equipped with an on-board digital controller 116 used to control various electrical components in the operation of the refueling vehicle 104.

Figure 1B:
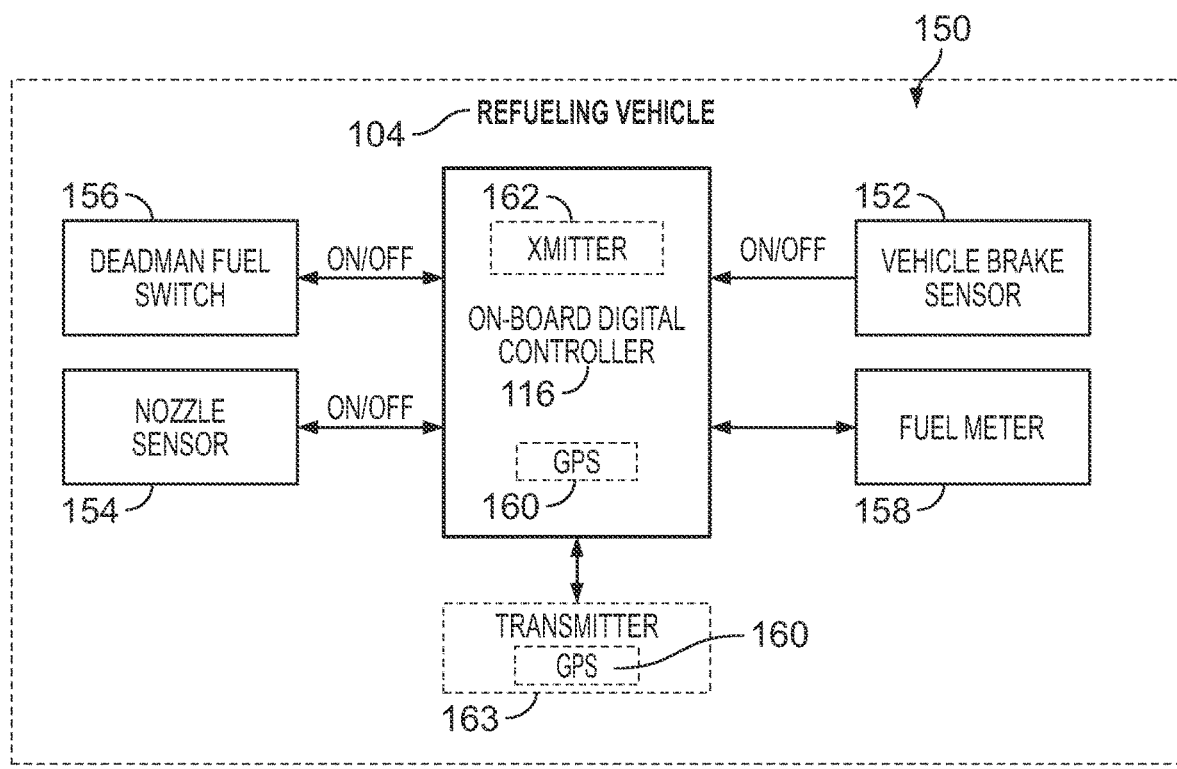
FIG. 1B is a schematic of an example a control system of a refueling vehicle.

FIG. 1B is a schematic of an example electrical control 150 system found within each of the refueling vehicles 104. As shown, the electrical control system 150 includes the on-board digital controller 116 and at least a vehicle brake sensor 152, a nozzle sensor 154, a deadman fuel switch 156 and a fuel meter 158. In certain embodiments, the on-board digital controller 116 includes a location identifier such as a global positioning system (GPS) 160 or is in communication with a location identifier. In certain embodiments, each of the vehicle brake sensor 152, nozzle sensor 154 and deadman fuel switch 156 comprises a proximity sensor capable of providing an ON/OFF signal to the on-board digital controller 116; any other type of electrical control device capable of indicating an operating status of one or more of the vehicle brake sensor 152, nozzle sensor 154 and deadman fuel switch 156 can also be used.

In operation, the vehicle brake sensor 152 supplies an ON signal to the on-board digital controller 116 to indicate that a brake of refueling vehicle 104 is engaged preventing movement of the refueling vehicle. An OFF signal to the on-board digital controller 116 indicates that the brake of the refueling vehicle 104 has been disengaged for vehicle movement/travel. The nozzle sensor 154 supplies an ON signal to the on-board digital controller 116 to indicate that the nozzle of the fuel hose 114 is open to deliver fuel to an aircraft and supplies an OFF signal to indicate that the nozzle is closed preventing fuel delivery. The deadman fuel switch 156 supplies an ON signal to the on-board digital controller 116 to indicate that all interlocks within the control system 150 for delivery of fuel are present and that delivery of fuel is currently occurring; an OFF signal indicates delivery of fuel has stopped.

The fuel meter 158 (representative of an existing flow meter that measures the flow rate of the delivered fuel and a fuel register that converts the flow rate into volume) supplies a signal to the on-board digital controller 116 that is representative of the amount of fuel delivered to an aircraft. Various other components within the refueling vehicle can also be in communication with the on-board digital controller 116, such as, motors, valves, pressure transducers, other sensors, etc.

The control system 150 of the refueling vehicle 104 additionally includes a wireless transmitter 162 (or transceiver for two-way communication). In certain embodiments, the transmitter on-board to the digital controller 116 utilizes one or both of far field and near field communication protocols to transmit the ON/OFF status of the vehicle brake sensor 152, the nozzle sensor 154, the deadman fuel switch 156 as well as the signal from the fuel meter 158. In certain embodiments, the transmitter 162 within the on-board digital controller is equipped for near field communication and communicates through a near-field communication protocol, such as blue tooth, to a transmitter 163 that is located remotely, within the refueling vehicle, from the on-board digital controller 116. In this configuration, the transmitter 163 receives the near field communication from the on-board controller 116 and transmits the received communication to a device external to the refueling vehicle 104 using a far field communication protocol; the transmitter 163 can additionally transmit a signal (e.g., a heartbeat signal—a signal that transmits on a consistent periodic basis) to indicate whether its blue tooth abilities to receive transmissions from the transmitter 162 are active. Near and far field communication protocols can include, for example, WiFi, Bluetooth, radio, Zigbee, NFC (Near Field Communication), Z-Wave, Insteon, and Thread; other communication protocols are also possible.

Figure 2:
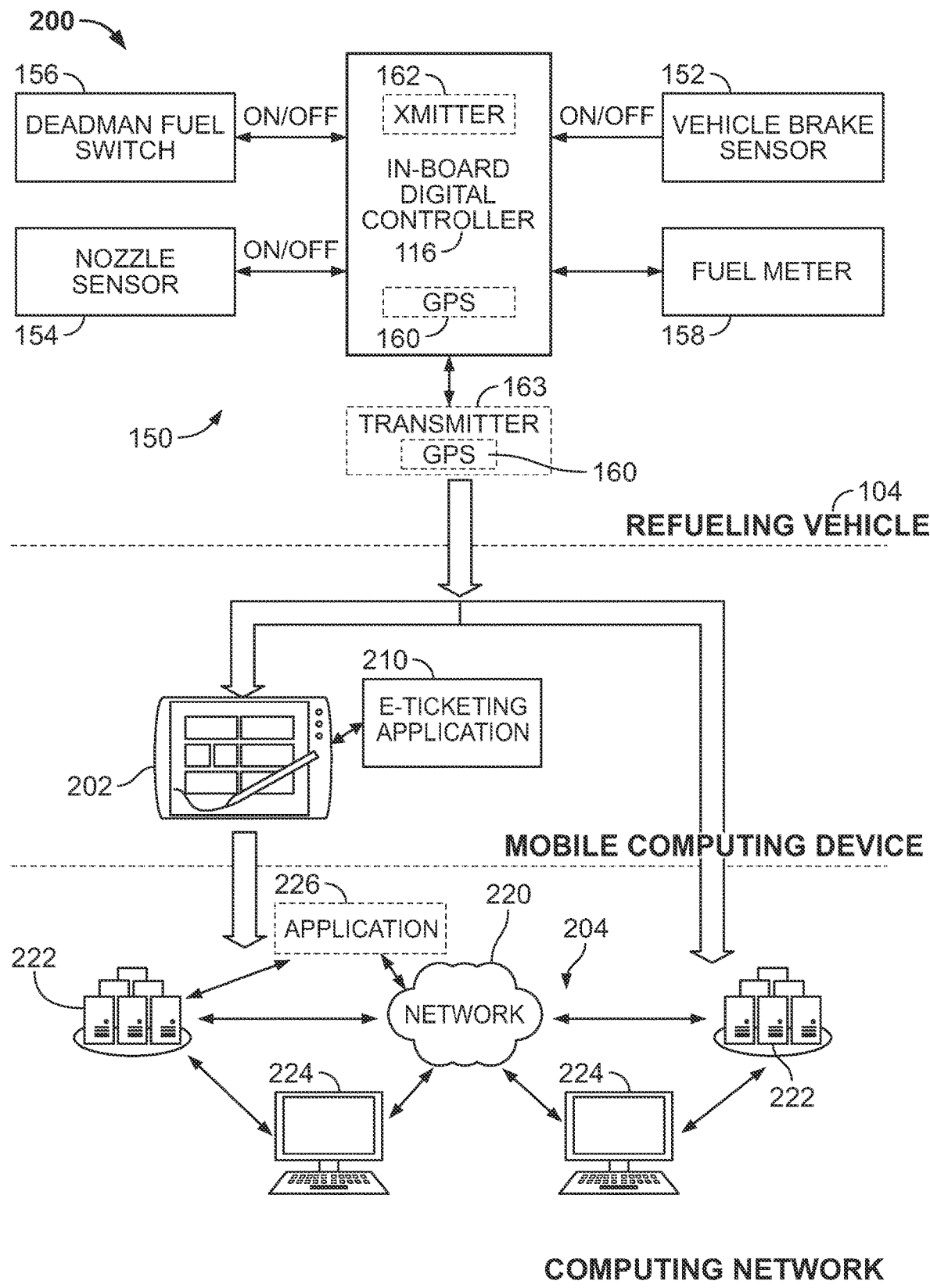
FIG. 2 is schematic of an example aircraft ground refueling management system.

Referring to FIG. 2, an example of an aircraft ground refueling management system 200 is illustrated. As shown, the aircraft ground refueling management system 200 generally comprises the refueling vehicle 104 and its control system 150, a mobile computing device 202 that receives communications from the control system 150 and transmits to a computing network 204. Inherent within the aircraft ground refueling management system 200 is a communication environment. The communication environment includes one or both of transmitters 162, 163 within the refueling vehicle 104 that transmit, in real-time, to one or both of a mobile computing device 202 and a computing network 204. An example configuration of a mobile computing device 202 or other computing devices that can be used in the practice of principles of the present disclosure are described with reference to FIG. 9.

In certain embodiments the mobile computing device 202 is an integrated element of aircraft ground refueling operations in that it is typically carried by an operator of the refueling vehicle and is the device through which the operator receives a refueling request; mounting of the mobile computing device 202 within the refueling truck 104 is also possible. In certain embodiments, responsive to a refueling request, the mobile computing device 202 executes an electronic ticketing, or e-ticketing, application 210. The e-ticketing application 210 provides instructions to the mobile computing device 202 causing it to capture the fueling data as well as the ON/OFF status of the vehicle brake sensor 152, the nozzle sensor 154, the deadman fuel switch 156 of the refueling truck 104 amongst other data in the transmissions from the refueling vehicle. Further, the e-ticketing application 210 causes the mobile computing device 202 to log a refueling request and generates an e-ticket, record on the e-ticket a total amount of fuel delivered responsive to the fueling request and record on the e-ticket a total cost for the delivered fuel. Upon sign-off of the e-ticket by a client, the e-ticket serves as a client receipt of the refueling operation. The instructions of the e-ticketing application 210 further cause the mobile computing device 202 to transmit the e-ticket and related data (e.g., time of issuance and time of sign-off, volume and cost of fuel, etc.) to the computing network 204; the mobile computing device 202 transmits the e-ticket (and its related data) as well as all or a portion of the data received from the refueling vehicle in real-time.

In certain embodiments, the e-ticketing application 210 additionally causes the mobile computing device 202 to transmit a real-time heartbeat signal to the computing network 204 providing an indication of its operational status (e.g., an ongoing heartbeat indicates continued operation while a stopped heartbeat indicates the mobile computing device 202 is not transmitting or not operational). In certain embodiments, the heartbeat can be representative of one or both of near field and far field communication abilities. In the context of nearfield communication abilities, the heartbeat can be representative of the mobile computing device 202 receiving transmissions from a transmitter within the refueling truck. In certain embodiments, the operator 105, or transmission from the refueling truck 104, operates to activate the heartbeat of the mobile computing device 202 with the start of the heartbeat indicating that the operator 105 has received a refueling request. It should be noted that, while the functions described herein are attributed to a single application, the functions may also be spread among a plurality of applications executed on the mobile computing device 202.

The computing network 204 can include any combination of computing devices connected over a wired or wireless network 220. The computing devices can include, for example, one or more server computers 222 and one or more personal computers 224. The computing devices execute instructions of an aircraft ground refueling management application 226; the instructions may be stored on each device, spread across multiple devices or stored on a single device. The aircraft ground refueling management application 226 utilizes data received from one or both the control system 150 of the refueling vehicle 104 and the mobile computing device 202 to perform and generate results of various data analysis operations such as identifying operational events where time durations can be reduced, identifying potential issues with refueling equipment of a refueling vehicle, identifying potential issues with a specific refueling vehicle operator, refueling vehicle fleet management including establishing a fleet fueling schedule based on historical refueling data and/or current fleet status. Further details regarding the performance and generation of results through execution of the aircraft ground refueling management application 226 are described herein. In certain embodiments, the mobile computing device 202 and/or the on-board digital controller 116 also execute the ground refueling management application 226. The functions of the ground refueling management application 226, while described in the context of a single application may also be spread among a plurality of applications.

Referring now to FIG. 3A, a basic timeline 300 for the operational events of a ground refueling operation, as executed by an operator 105 and refueling truck 104 (see FIG. 1A), are illustrated. As shown, the operational events include an idling event 302, a travel event 304, a set-up event 306, a fueling event 308, a wait event 310, a disconnect event 312 and, optionally, a second travel event 314.

The idling event 302 is representative of the time a refueling truck 104 (see FIG. 1A) is maintained in a designated location prior to receiving a refueling request. The travel event 304 is representative of the refueling truck 104 leaving its designated location and traveling to a refueling location proximate an aircraft 102 upon the operator 105 receiving a refueling request via the mobile computing device 202. The set-up event 306 is representative of the time spent by the operator 105 readying the refueling vehicle 104 to deliver/pump fuel to the aircraft 102. The fueling event 308 is representative of the time spent actually delivering/pumping fuel to the aircraft 102. The wait event 310 is representative of the time spent from the end of fuel delivery until the e-ticket is electronically signed, acknowledged or otherwise accepted by a client (e.g. an airline employee). The disconnect event 312 is representative of the time elapsed from acceptance of the e-ticket, the operator readying the refueling vehicle for travel, and the start of travel. The second travel event 314 represents the time the refueling truck 104 travels from its location proximate the aircraft to another location, which can be a designated idling location or to another refueling location proximate a new aircraft 102.

The time period of each refueling event 302-314 can be characterized by the aircraft ground refueling management application 226 based on known/expected sequence of events as well as the real time transmissions of the operational ON/OFF status of the vehicle brake sensor 152, the nozzle sensor 154 and the deadman fuel switch 156 from the refueling vehicle 104, the real time transmission of fuel meter data from the refueling vehicle 104, the real time transmission of generation and acceptance of the e-ticket from the mobile computing device 202, and the real time transmission of the heartbeat from the mobile computing device. Table 1 below illustrates the start event markers and end event markers for the various refueling events utilized by the aircraft ground refueling management application 226.

TABLE 1

| Event | Start Event Marker | End Event Marker |
|---|---|---|
| Idle - 302 | Vehicle Brake Sensor ON | Vehicle Brake Sensor OFF (no intervening signals from Deadman Fuel Switch or Nozzle Sensor) |
| Travel - 304 | Vehicle Brake Sensor OFF | Vehicle Brake Sensor On (no intervening signals from Deadman Fuel Switch or Nozzle Sensor) |
| Set-Up - 306 | Vehicle Brake Sensor ON | First Instance of Deadman Fuel Switch ON |
| Fueling - 308 | First Instance of Deadman Fuel Switch ON | Last Instance of Deadman Fuel Switch OFF (Last Instance Allows for Intermittent Signal due to Transmission and/or Operational Issues) |
| Wait - 310 | Last Instance of Deadman Fuel Switch OFF | E-Ticket Acceptance |
| Disconnect - 312 | E-Ticket Acceptance | Vehicle Brake Sensor OFF |
| Travel - 314 | Vehicle Brake Sensor OFF | Vehicle Brake Sensor ON |

Figure 4A:
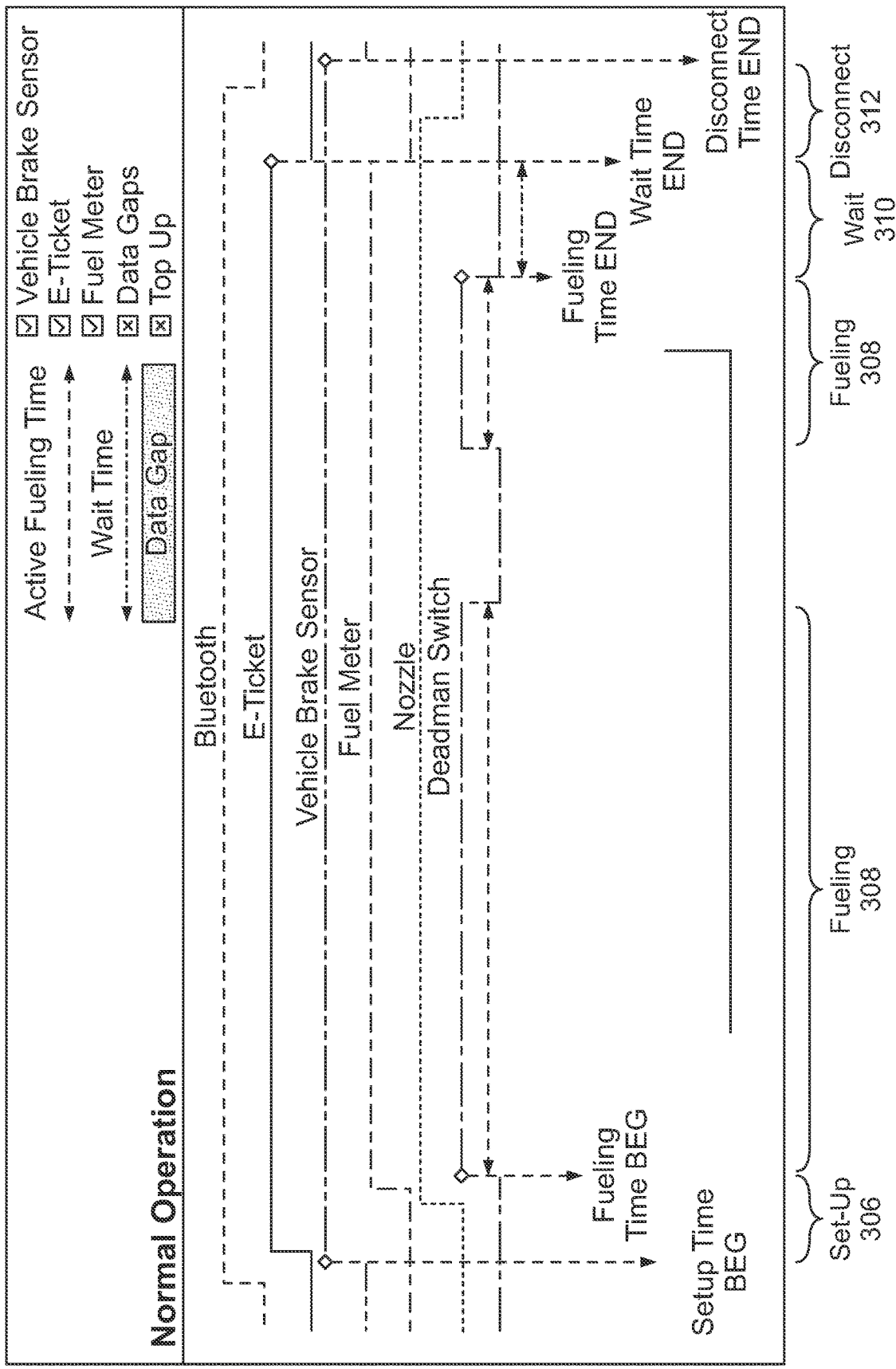
FIG. 4A is a signal graph illustrating the data points used to characterize the events of FIG. 3A.

FIG. 4A provides a signal chart illustrating the set-up event 306, fueling event 308, wait event 310 and disconnect event 312 outlined in Table 1. Note that the aircraft ground refueling management application 226 accommodates for the drop out of the signal from the deadman fuel switch 156 catching the last instance of the deadman fuel switch turning OFF prior to sign-off/acceptance of the e-ticket as the end of the fuel event 308 (a total of the fuel event would result in the first instance of the fuel event 308 added to the second instance of the fuel event 308).

Referring back to FIG. 3B, it illustrates a timeline 350 for the operational events of a ground refueling operation that includes a fuel top-up. A fuel top-up is a fuel delivery request from a client for additional fuel (e.g., a "top-up") subsequent completion of the original fuel delivery. As such, the timeline 350 includes the refueling events 302-314 of FIG. 3A with additional events that comprise a wait event 352 and a fueling event 354. The wait event 352 is representative of the time that occurs between acceptance of the original e-ticket by the client and the generation of a new (or modification of the original) e-ticket that reflects the request for additional fuel. The fueling event 354 is representative of the time spent actually delivering/pumping fuel to the aircraft 102 responsive to the top-up request. And, in the top-up context, the wait event 310 is representative of the time spent from the end of the top-up fuel delivery until the new/modified e-ticket is electronically signed, acknowledged or otherwise accepted by a client (e.g. an airline employee).

The time period of each refueling event 302-314 along with refueling events 352-354 can be characterized by the aircraft ground refueling management application 226 based on known/expected sequence of events as well as the real time transmissions of the operational ON/OFF status of the vehicle brake sensor 152, the nozzle sensor 154 and the deadman fuel switch 156 from the refueling vehicle 104, the real time transmission of fuel meter data from the refueling vehicle 104, the real time transmission of generation and acceptance of the e-ticket from the mobile computing device 202, and the real time transmission of the heartbeat from the mobile computing device. Table 2 below illustrates the start event markers and end event markers for the various refueling events utilized by the aircraft ground refueling management application 226.

TABLE 2

| Event | Start Event Marker | End Event Marker |
|---|---|---|
| Idle - 302 | Vehicle Brake Sensor ON | Vehicle Brake Sensor OFF subsequent Heartbeat Turned ON |
| Travel - 304 | Vehicle Brake Sensor OFF subsequent Heartbeat Turned ON | Vehicle Brake Sensor On |
| Set-Up - 306 | Vehicle Brake Sensor ON | First Instance of Deadman Fuel Switch ON |
| Fueling - 308 | First Instance of Deadman Fuel Switch ON | Deadman Fuel Switch OFF (Occurring prior to Generation of New/ Modification of Existing E-ticket) |
| Wait - 352 | Deadman Fuel Switch OFF (Occurring prior to Generation of New/ Modification of Existing E-ticket) | Generation of New/ Modification of Existing E-ticket |
| Fueling - 354 | First Instance of Deadman Fuel Switch ON Subsequent Generation of New/ Modification of Existing E-ticket | Last Instance of Deadman Fuel Switch OFF (Last Instance Allows for Intermittent Signal due to Transmission and/or Operational Issues) |
| Wait - 310 | Last Instance of Deadman Fuel Switch OFF | New/Modified E-Ticket Acceptance |
| Disconnect - 310 | New/Modified E-Ticket Acceptance | Vehicle Brake Sensor OFF |
| Travel | Vehicle Brake Sensor OFF | Vehicle Brake Sensor ON |

FIG. 4B provides a signal chart illustrating the set-up event 306, fueling event 308, wait event 352, fueling event 354, wait event 310 and disconnect event 312 outlined in Table 2. Once again, the aircraft ground refueling management application 226 accommodates for the drop out of the signal from the deadman fuel switch 156 catching the last instance of the deadman fuel switch 156 turning OFF prior to sign-off/acceptance of the new/modified e-ticket as the end of the fuel event 308 (a total of the fuel event would result in the first instance of the fuel event 308 added to the second instance of the fuel event 308).

Figure 5A:
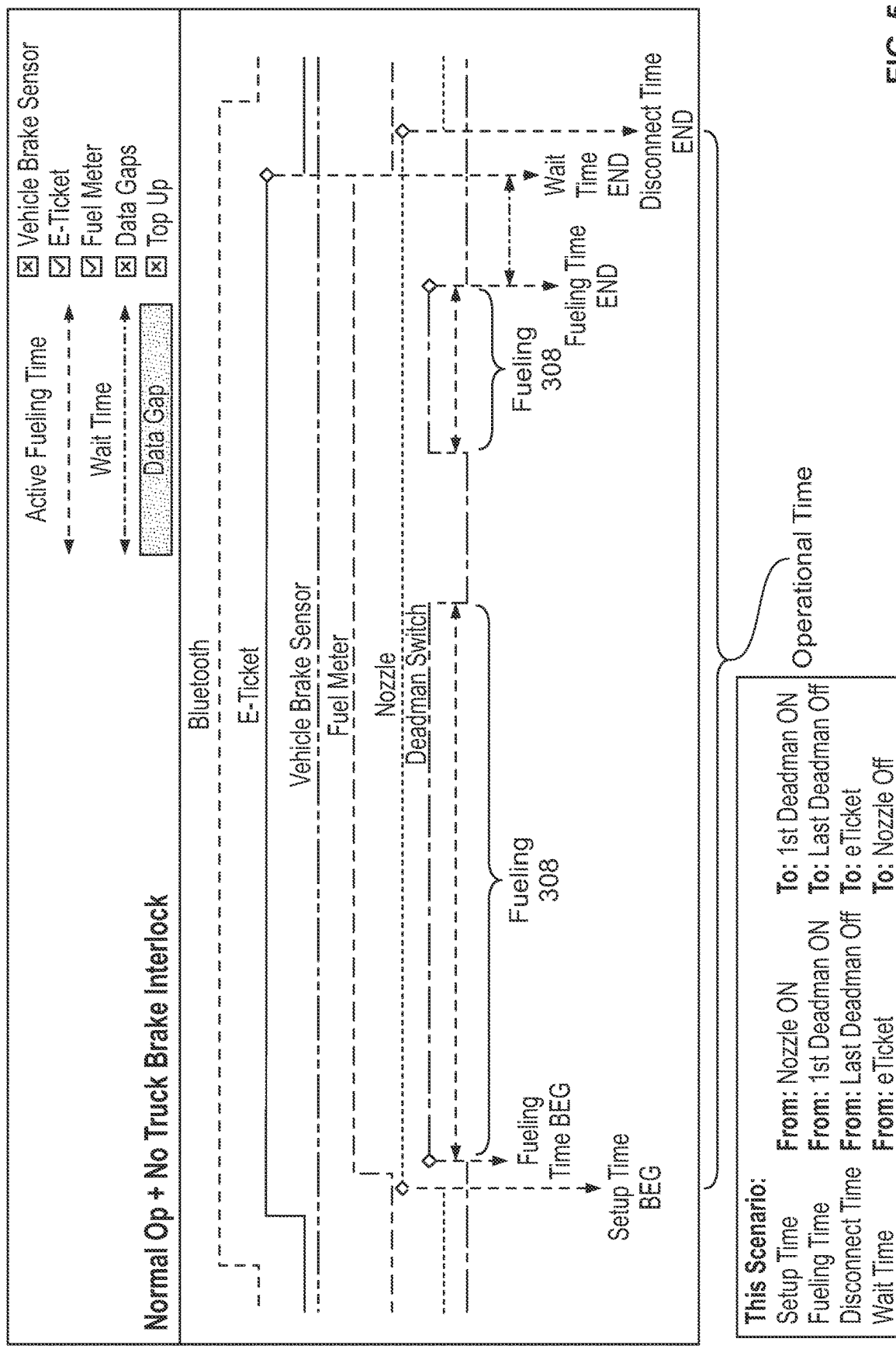
FIGS. 5A-5F each comprise a signal graph illustrating how events of an aircraft ground refueling operations can be re-characterized in response to the absence of one or more signals.
Figure 5B:
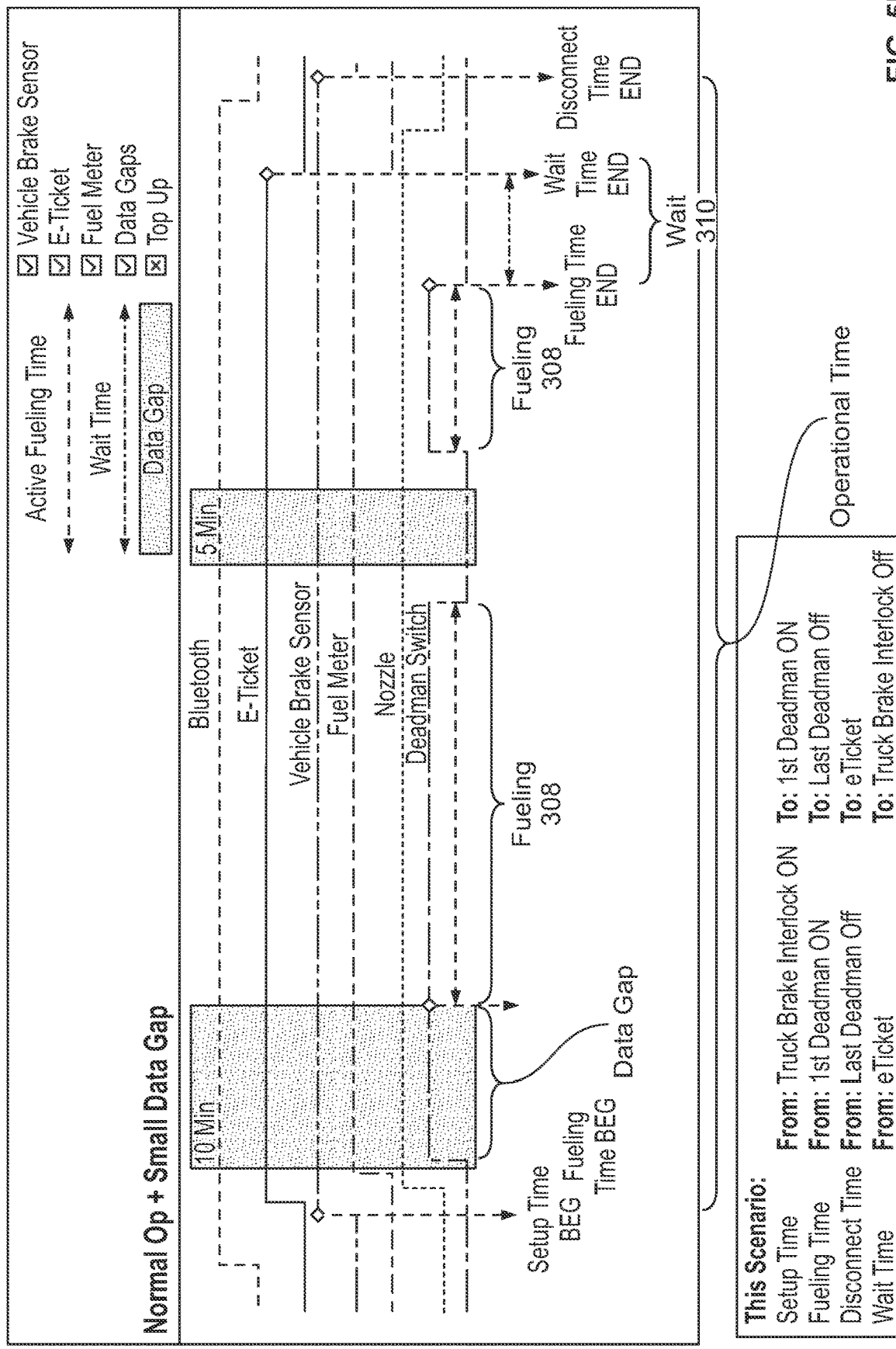
Figure 5C:
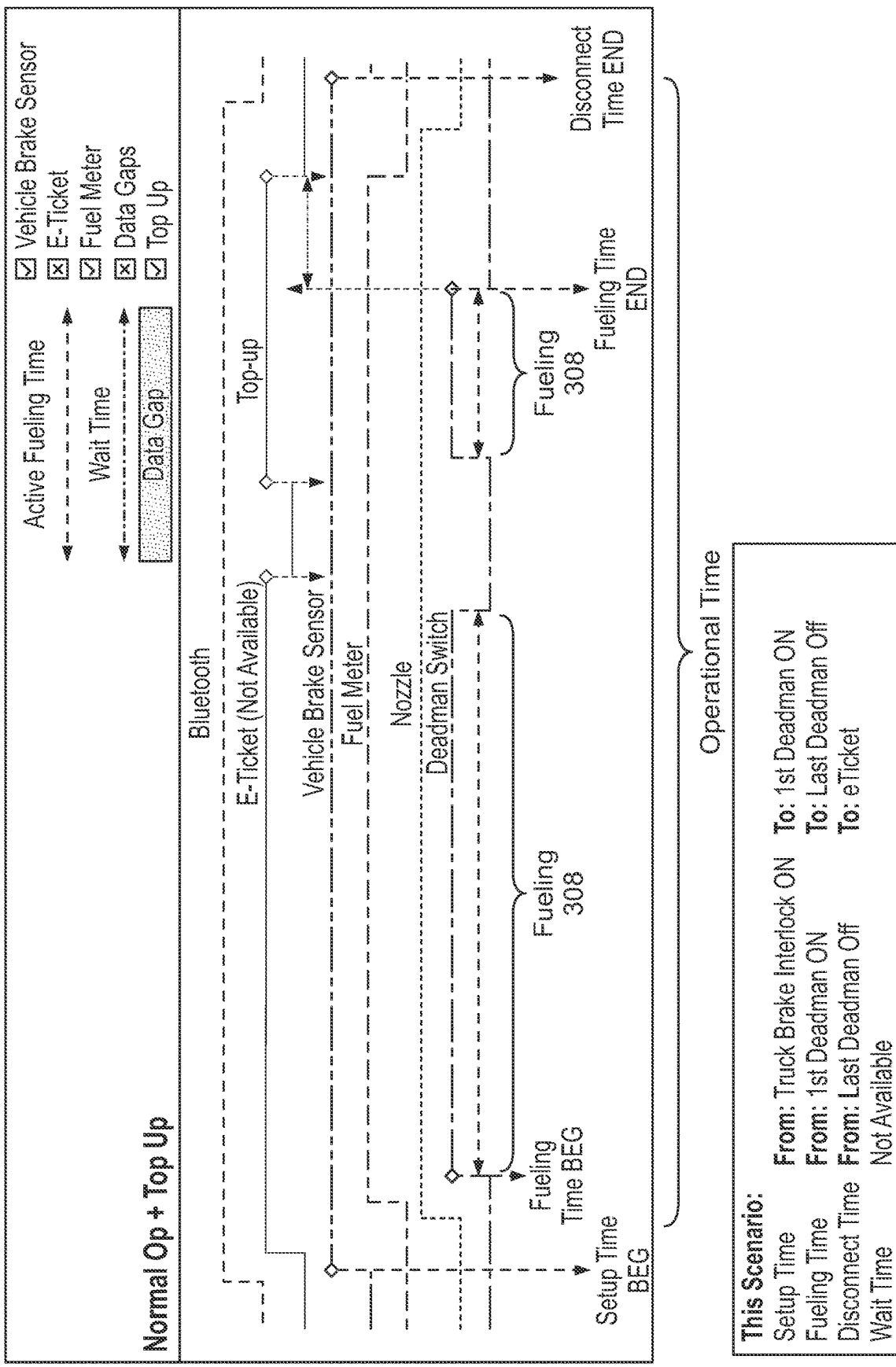

The aircraft ground refueling management application 226 includes instructions to accommodate the absence of one or more expected signals in order to still provide reliable and accurate data that can be used for further analysis. For example, in the instance of absence of the real-time signal from the vehicle brake sensor 152 (see FIG. 5A), the set-up event 306 is designated as starting from activation of the nozzle sensor 154 (e.g., nozzle sensor ON). In the instance that the deadman fuel switch 156 fails to signal ON until after fuel delivery has already begun (but is within a predetermined amount of time (e.g., a small data gap), such as, 5 min., 10 min., 15 min., since the start of the flow meter 158), see FIG. 5B., the time of the fuel event 308 will be deemed to occur from the first time the deadman fuel switch turns ON until the last deadman fuel switch turns OFF prior to acceptance of the e-ticket. In the instance that there is no e-ticket issuance and/or sign off, see FIG. 5C, the aircraft ground refueling management application 226 deems that there is no wait event 310 but rather only an overall operation time measured from the set-up event 306 to the end of the disconnect event 312 and a fuel event 308 that occurs from first deadman fuel switch 156 ON to deadman fuel switch OFF.

Figure 5D:
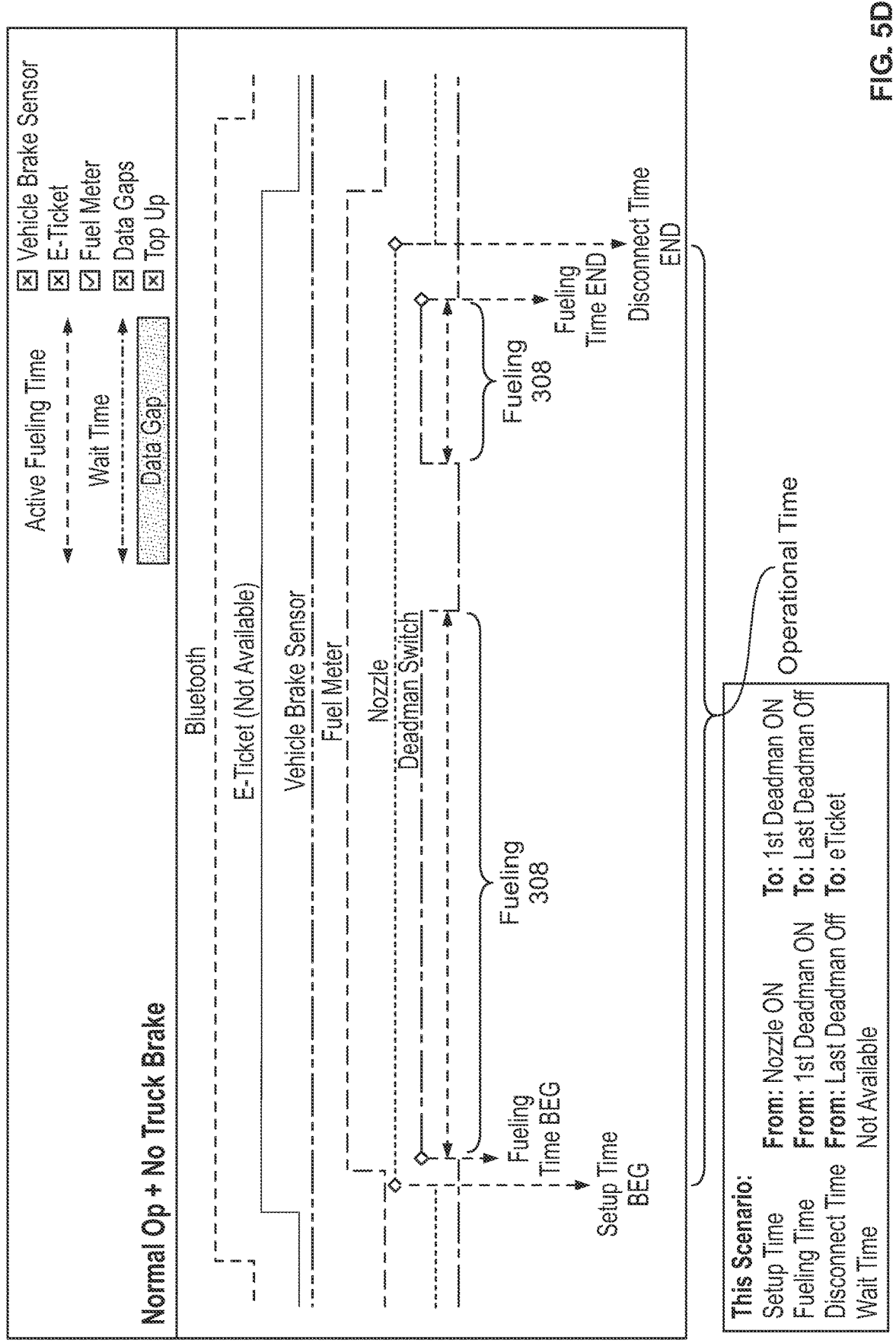
Figure 5E:
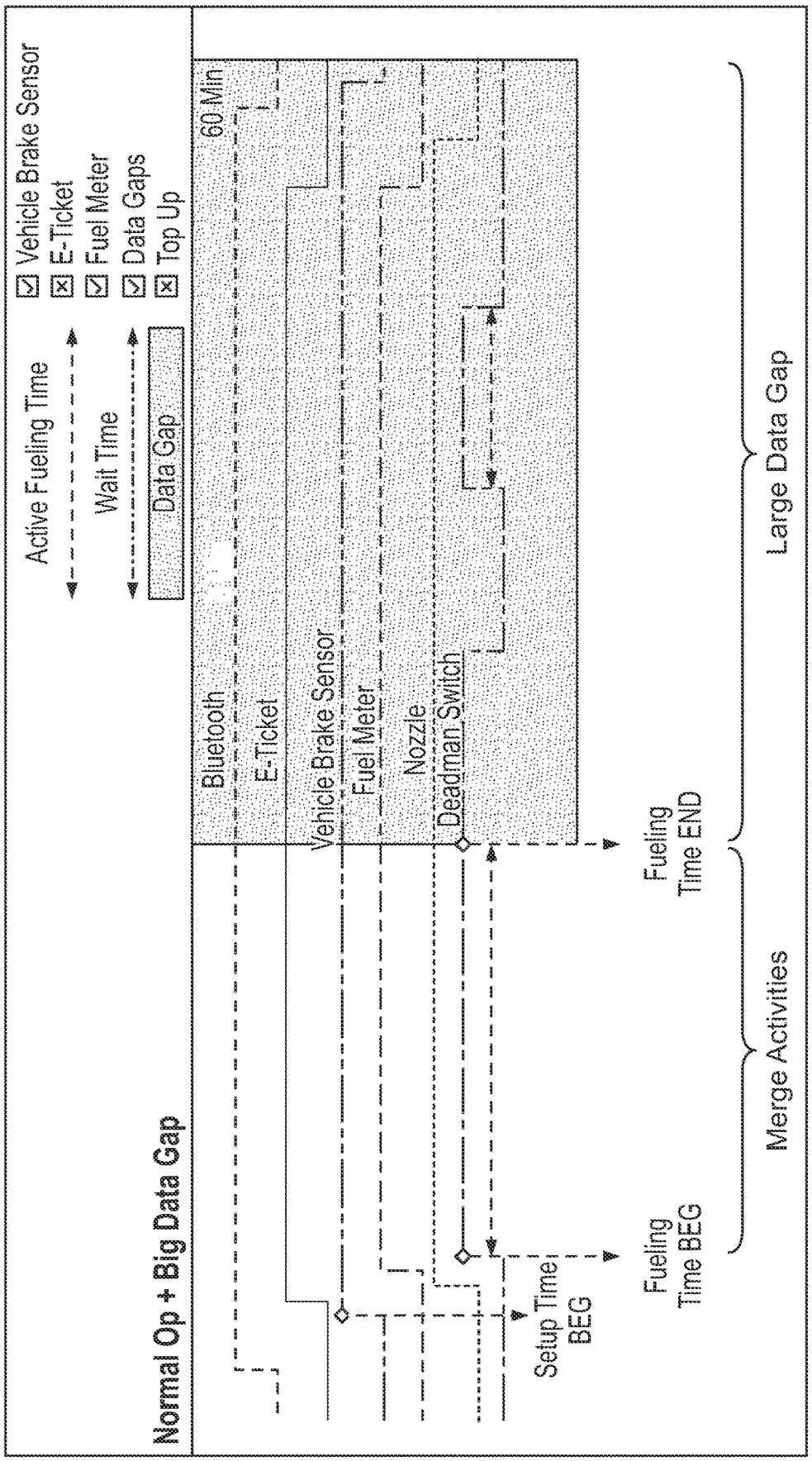
Figure 5E:
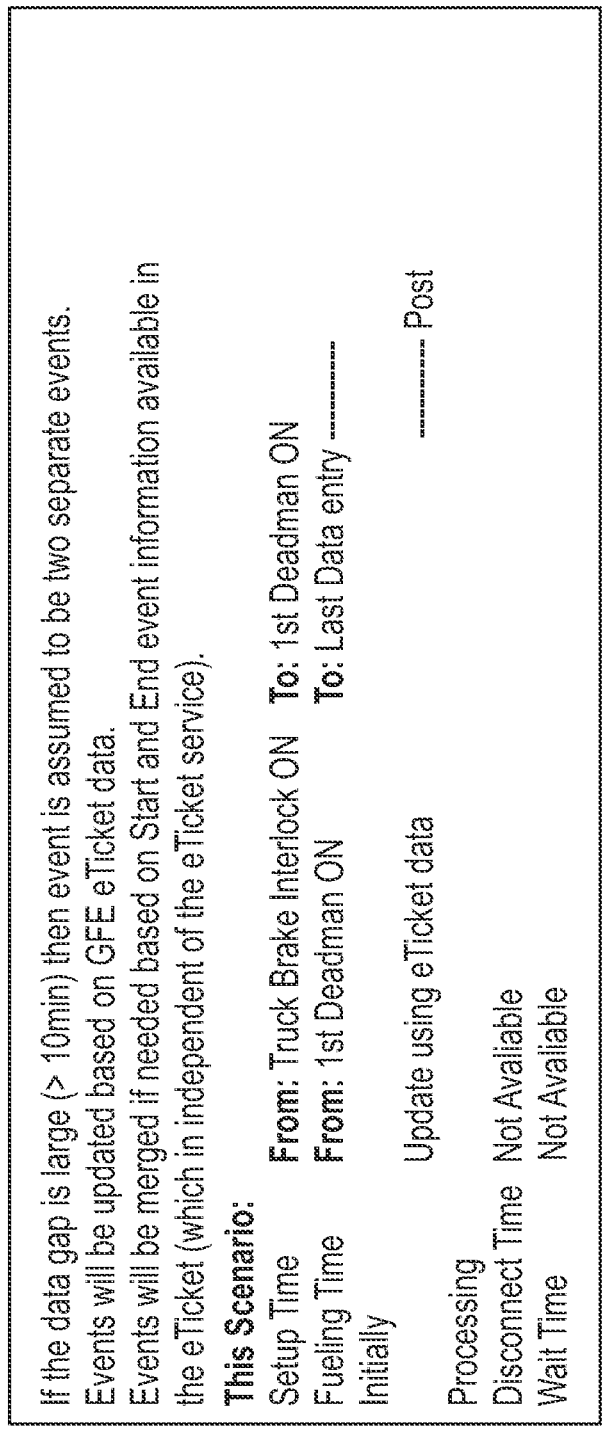
Figure 5F:
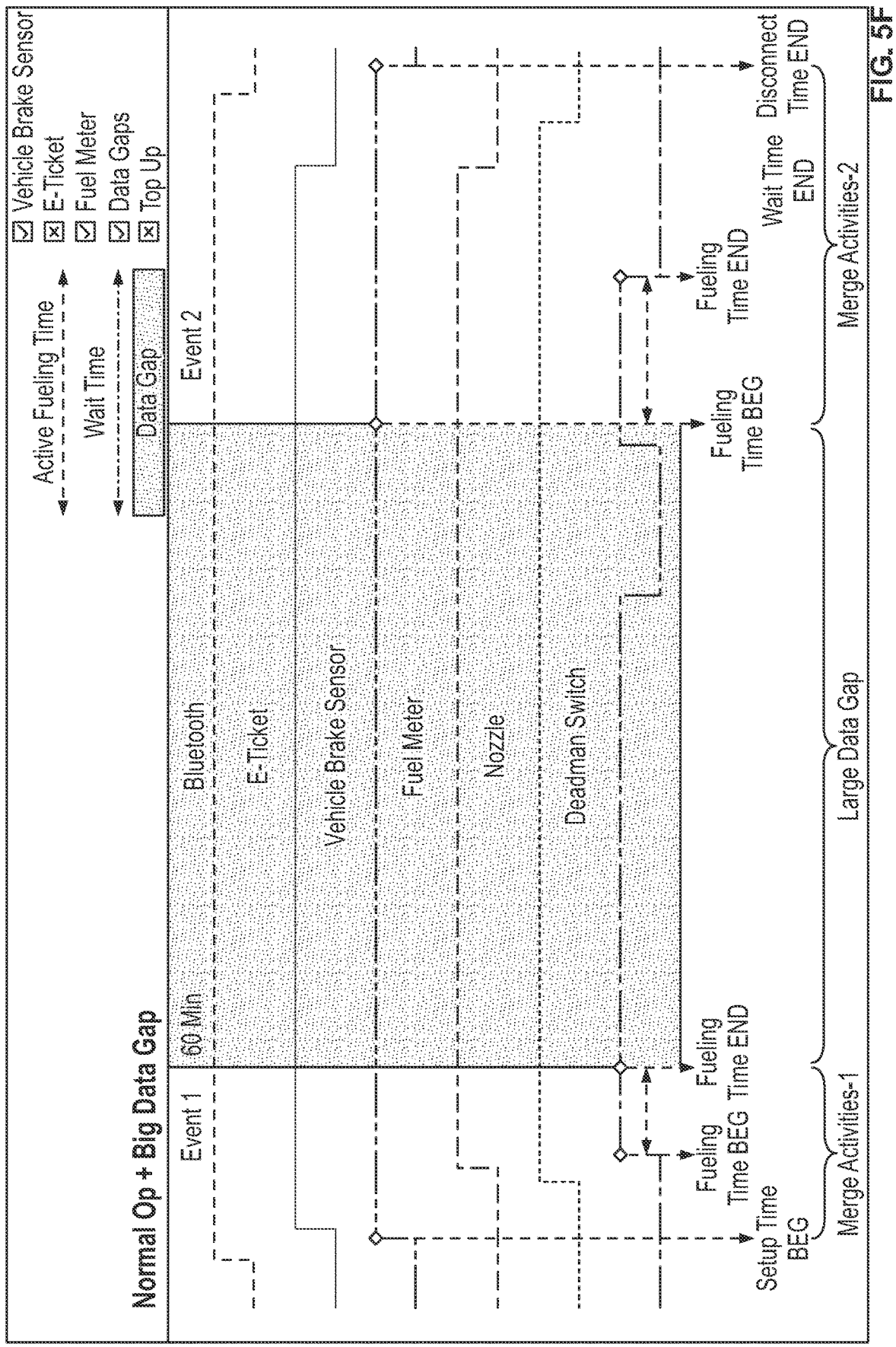

Further, in the instance that no e-ticket issues and/or is accepted and there is no vehicle brake sensor signal 152, see FIG. 5D, the aircraft ground refueling management application 226 deems there is no wait event 310 only an overall operation time measured from the beginning of the set-up event 306 to the nozzle sensor 154 OFF and the fueling event 308 is from the deadman fuel switch ON to the last deadman fuel switch OFF prior to the nozzle sensor OFF. In the instance that an e-ticket has issued but not been accepted and a large data gap (e.g. a period of time greater than a predetermined threshold amount of time) exists with no occurrence of a wait event 310 or disconnect event 312, see FIG. 5E, the aircraft ground refueling management application 226 records the activity as an event that can be merged with another event based upon the ultimately accepted e-ticket, a common location that can be provided by the GPS (within the refueling truck 104 and/or the mobile computing device 202), and/or another data point that illustrates that two or more sets of mergeable activities as related. FIG. 5F illustrates the merging of a first event (Event 1) with a second event (Event 2) that were originally separated by a large data gap.

With all, or at least a portion, of start and end event markers for various events of aircraft ground refueling operations logged, time durations of the events can be calculated and stored in relation to a specific refueling vehicle, a specific operator, a specific refueling vehicle fleet, a specific location (e.g., a specific airport), or any other useful manner of categorizing the data. Costs and volumes of fuel delivered can also be logged and used for analysis.

Figure 6:
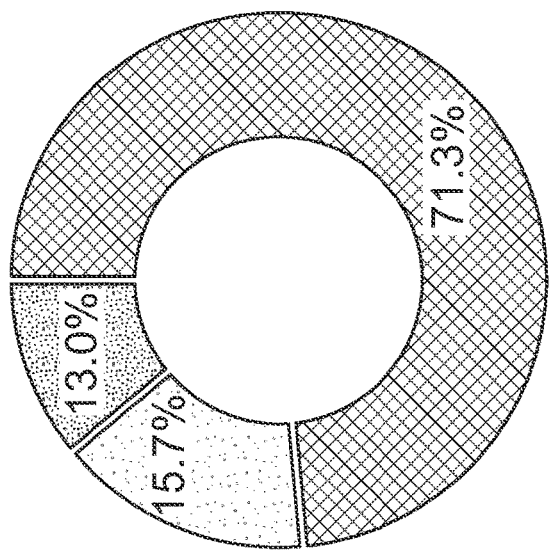
FIG. 6 illustrates an example display of a fueling time breakdown as generated by an aircraft ground refueling management application according to the present disclosure.

In an example context for analysis, the aircraft ground refueling management application 226 can utilize historical time durations of ground refueling events to generate and display to a user of the application a percentage breakdown of events. Consider the display example of FIG. 6, wherein the calculated fueling times, set-up times and disconnect times determined for a fleet are averaged to provide an overall breakdown in fueling event times. The percentages of set-up time and disconnect time illustrate areas in which possible improvement (e.g. reduction in time) can occur. Upon implementing operator procedures to help improve times, comparisons can be made on data prior to implementing procedures and subsequent implementing procedures to verify that the implemented procedures have actually been beneficial. The percentages of set-up time and disconnect time illustrate areas in which possible improvement (e.g. reduction in time) can occur. Upon implementing operator procedures to help improve times, comparisons can be made on data prior to implementing procedures and subsequent implementing procedures to verify that the implemented procedures have actually been beneficial.

Figure 7:
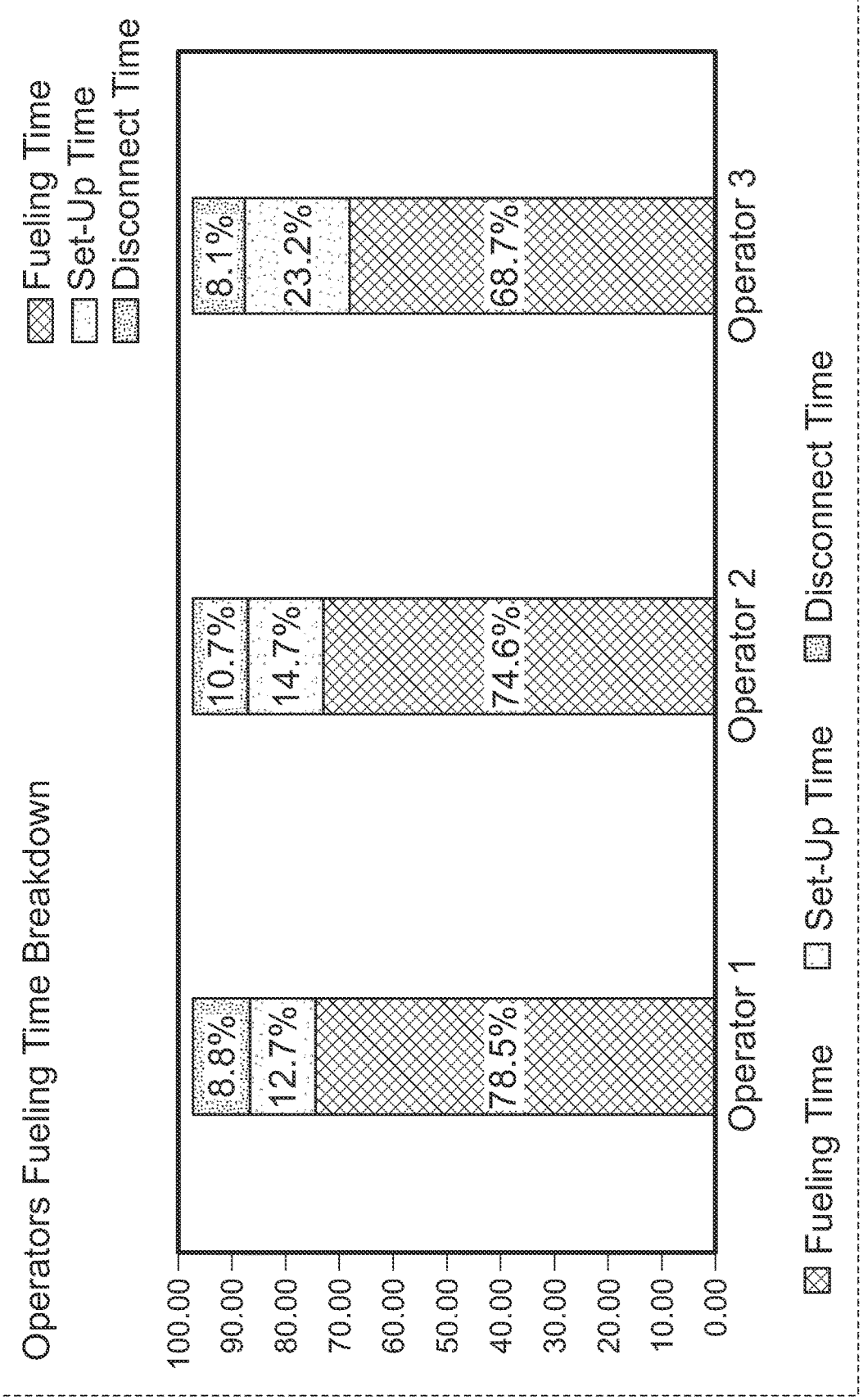
FIG. 7 illustrates an example display of an operators fueling time breakdown as generated by an aircraft ground refueling management application according to the present disclosure.

In another example context for analysis, the aircraft ground refueling management application 226 can utilize historical time durations of ground refueling events to generate and display to a user of the application a percentage breakdown of refueling events on a per operator basis. Consider the display example of FIG. 7, wherein the calculated fueling times, set-up times and disconnect times determined for each of three operators are averaged to provide an overall breakdown in fueling event times per operator. Disparities in event fueling times among operators indicates that the operator themselves are working more or less efficiently than others or that their respective refueling vehicles are working more or less efficiently. Accordingly, procedures can be implement to improve operator performance and/or components of the respective refueling trucks can be assessed to determine reduced functionality and/or failure of certain components that can be replaced to improve event times in refueling operations.

Figure 8:
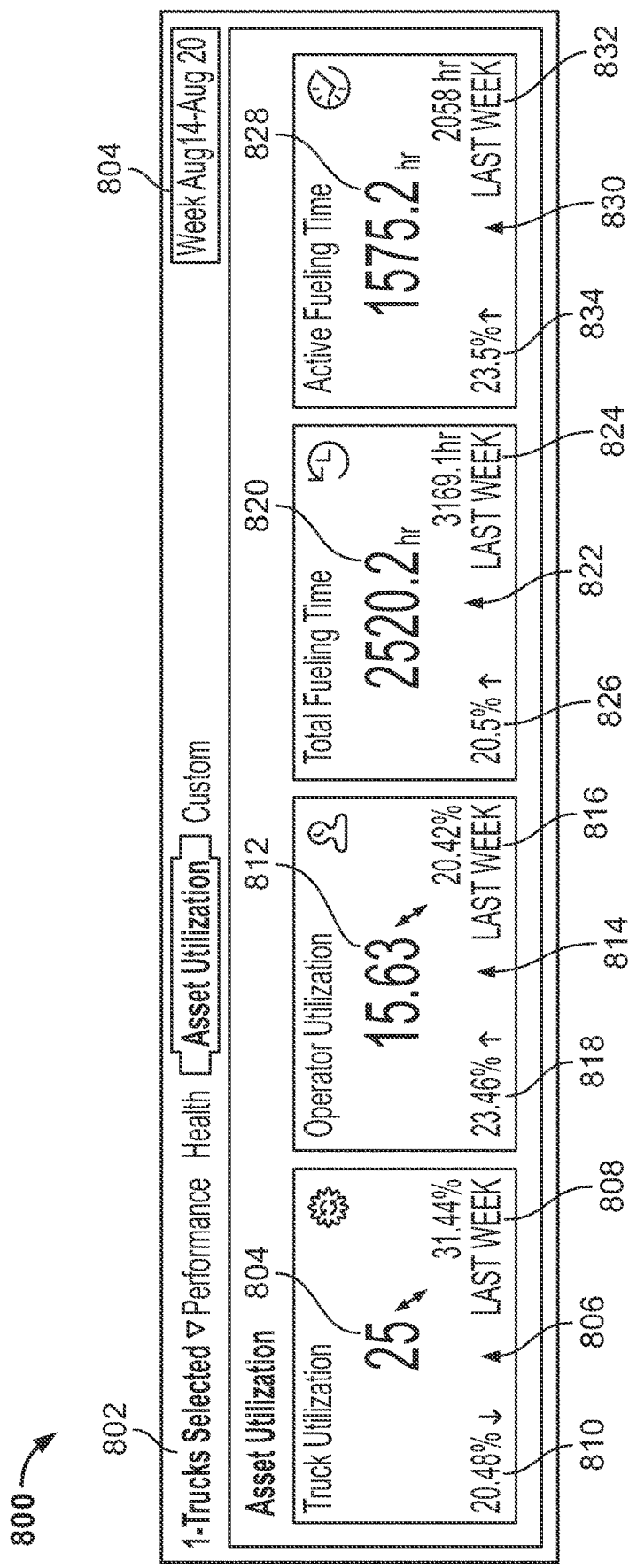
FIG. 8 illustrates an example display of an asset utilization analysis generated by an aircraft ground refueling management application according to the present disclosure.

In still another example context for analysis, aircraft ground refueling management application 226 can utilize historical time durations of ground refueling events to provide an information on asset utilization. Consider the asset utilization display 800 example of FIG. 8, wherein a drop down menu 802 provides the user with an opportunity to select one or more assets from a plurality of displayed assets (e.g., "1—Truck Selected") whereby the aircraft ground refueling management application 226 is caused to determine and display for a selected time period 802:

- a percentage of time 804 that the truck was during the time period (e.g. truck utilization window 806) along with a lower right corner indication of the percentage utilization in the previous time period 808 and a lower left corner indication of a percentage increase/decrease in utilization over a predetermined time period 810.
- a percentage of time 812 that a specific operator was utilized as the operator of the selected asset during the time period (e.g. operator utilization window 814) along with a lower right corner indication of the percentage utilization in the previous time period 816 and a lower left corner indication of a percentage increase/decrease in utilization over a predetermined time period 818.
- a percentage of time 820 that the asset spent in fueling time operations during the time period (e.g. total fueling time window 822) along with a lower right corner indication of the percentage of total fueling time operations in the previous time period 824 and a lower left corner indication of a percentage increase/decrease in total fueling time over a predetermined time period 826.
- a percentage of time 828 that the asset spent in active fueling time (e.g. fueling event time 308) during the time period (e.g. active fueling time window 830) along with a lower right corner indication of the percentage of active fueling time in the previous time period 832 and a lower left corner indication of a percentage increase/decrease in total fueling time over a predetermined time period 834.

The aircraft ground refueling management system provides a methodology for tagging fueling event stages by inferentially obtaining starting and ending fueling event markers through use of existing fueling operation components thereby eliminating any additional cost and installation time that would result from added components. The aircraft ground refueling management system helps to ensure the accurate capture of refueling data which can provide leading indicators for refueling asset management. The data obtained by the aircraft ground refueling system provides the opportunity to reduce turnaround time of an aircraft refueling cycle by identifying specific refueling events in which the amount of time spent in executing the event can be reduced. In certain embodiments, the aircraft ground refueling management system considers that the time for all refueling events, except for the actual fueling event, can potentially be reduced.

Figure 9:
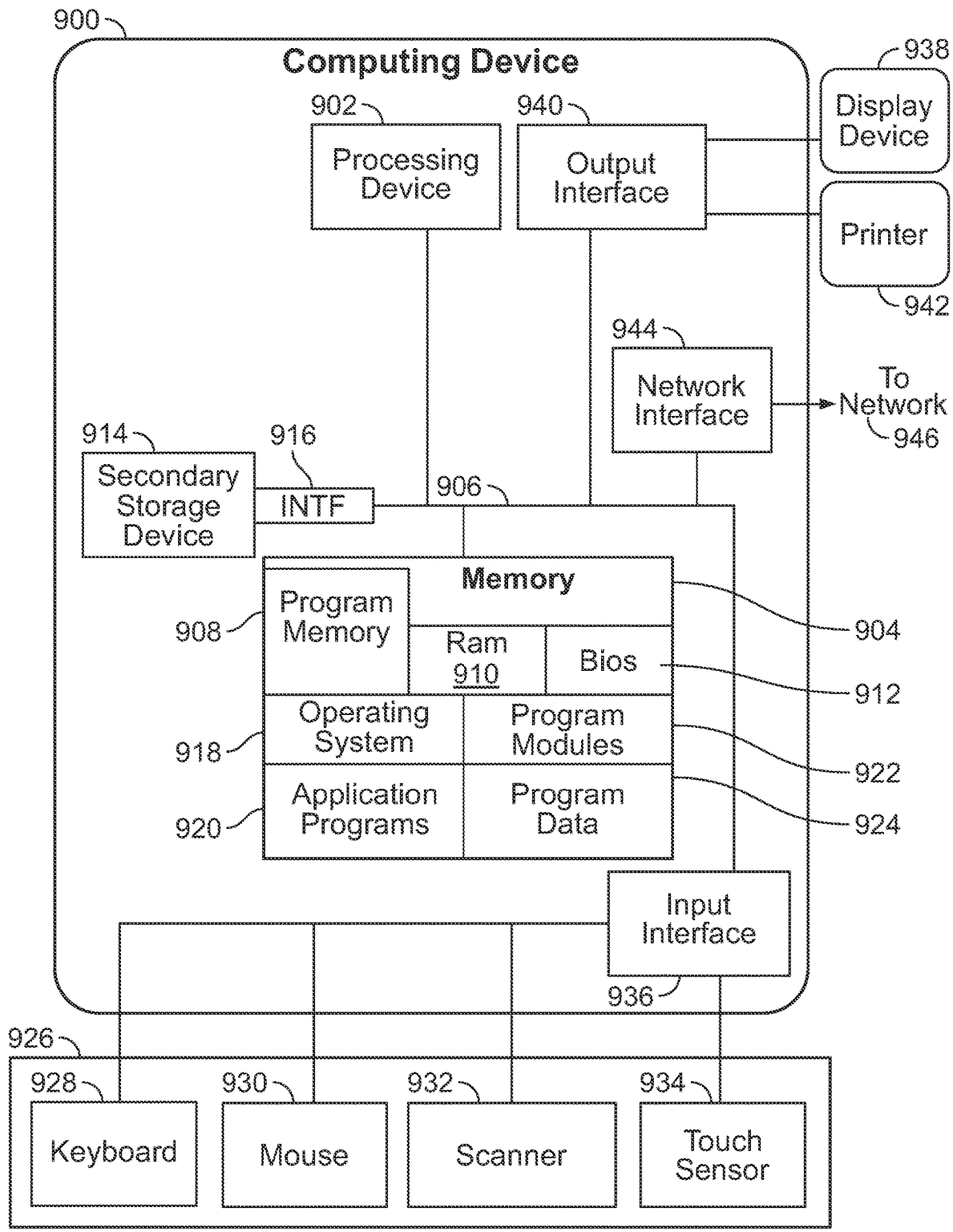
FIG. 9 is a schematic of an example computing device that can be used to practice various aspects of the present disclosure.

FIG. 9 illustrates an exemplary architecture of a computing device 900 that can be used to implement aspects of the present disclosure including the mobile computing device 202 and computing devices 222, 224 of the computing network 204. The computing device 900 can be in any suitable form including a microcontroller, a microprocessor, a desktop computer, a laptop computer, a tablet computer, a mobile computing device (e.g., smart phone, iPod™, iPad™, or other mobile device) or other device configured to process digital instructions. The exemplary computing device 900 may be configured specific to its intended use incorporating various peripherals and programming instructions, as described herein, to achieve desired operations. Further, it is understood that the computing device 900 is an example of programmable electronics, which may include one or more such computing devices, and when multiple computing devices are included, such computing devices can be coupled together with a suitable data communication network, e.g., network 220, so as to collectively perform the various functions, methods and operations disclosed herein.

In general terms, the computing device 900 includes at least one processing device and at least one computer readable storage device. The processing device operates to execute data instructions stored in the computer readable storage device to perform various operations, methods, or functions described herein.

In more particular terms and with reference to FIG. 9, the computing device 900 includes at least one processing device 902, such as a central processing unit (CPU), as well as a system memory 904 and a system bus 906. The system bus 906 couples various system components including the system memory 904 to the processing device 902. The system bus 906 is one of any number of types of bus structures including a memory bus, a peripheral bus, and a local bus using any variety of bus architectures.

The system memory 904 includes program memory 908 and random access memory (RAM) 910. A basic input/output system (BIOS) 912 containing the basic routines that act to transfer information within the computing device 900, such as during start up, is typically stored in the program memory 908. In some embodiments, the computing device 900 also includes a secondary storage device 914, such as a hard disk drive or file server, for storing digital data. The secondary storage device 914 is connected to the system bus 906 by a secondary storage interface (INTF) 916. The secondary storage device 914, and its associated computer readable media, provides nonvolatile storage of computer readable instructions (including application programs and program modules), data structures, and other data for the computing device 900.

Although the exemplary computing device 900 described herein employs a secondary storage device 914, in some the embodiments the secondary storage device is eliminated or its hard disk drive/file server configuration is replaced with an alternative form of computer readable storage media. Alternative forms of computer readable storage media include, but are not limited to, magnetic cassettes, flash memory cards, digital video disks, Bernoulli cartridges, compact disc memories, digital versatile disk memories, and random access memories. Some embodiments of the secondary storage devices 914 include non-transitory media. Further, the computer readable storage media can include local storage or cloud-based storage.

A number of program modules can be stored in the memory 904, or the secondary storage device 914. These program modules include an operating system 918, one or more application programs 920, other program modules 922 as described herein (e.g., e-ticketing application 210 and/or aircraft ground refueling management application 226) and program data 924. The computing device 900 can utilize any suitable operating system, such as Microsoft Windows™, Google Chrome™, Apple OS, and any other operating system suitable for a computing device.

The computing device 900 typically includes at least some form of computer readable media, e.g., computer readable media within the memory 904 or secondary storage device 914. Computer readable media includes any available media that can be accessed by the computing device 900. By way of example, computer readable media includes computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 900.

In some embodiments, a user provides inputs to the computing device 900 through one or more input devices 926. Examples of input devices 926 include a keyboard 928, a mouse 930, a camera/scanner 932, and a touch sensor 934 (such as a touchpad or touch sensitive display). In some embodiments, the input devices 926 are incorporated into the computing device 900 itself. In some embodiments, the input devices 926 are external to the computing device 900 and are connected to the processing device 902 through an input interface 936 that is coupled to the system bus 906. The input devices 926 can be connected by any number of input/output interfaces, such as parallel port, serial port, game port, universal serial bus, or a custom interface. Wireless communication between input devices and the input interface 936 is possible as well, and includes infrared, BLUETOOTH® wireless technology, 802.11/a/b/g/n, cellular, or other radio frequency communication systems in some possible embodiments.

In the example embodiment of FIG. 9, the computing device 900 incorporates within or is operably coupled to a display device 938. Examples of the display device 938 include a monitor, a liquid crystal display device, a projector, or a touch sensitive display device. The display device 938 is also connected to the system bus 906 via an output interface 940, such as a display controller. In addition to the display device 938, the computing device 900 can control via output interface 940 various other peripherals such as a printing device 942 or speaker (not shown). As with the input interface 936, the output interface 940 can comprise any number of input/output interfaces such as those described in the paragraph above.

The computing device 900 further includes a network interface 944 that includes a network communication device to communicate digital data across a data communication network 946. An example of the network interface 944 includes a wireless transceiver for transmitting digital data over a wireless network. The wireless transceiver is configured to work with one or more wireless communication technologies such as cellular communication, Wi-Fi communication (such as that conforming to one of the IEEE 802.11 family of communication protocols), Bluetooth® communication, and the like. In other embodiments, the network interface 944 is an Ethernet network interface device having an Ethernet port for receiving an Ethernet cable to transmit and receive digital data across the Ethernet cable to a network 946 such as a local area network or the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed:

1. A method of defining fueling events of an aircraft ground refueling operation, the method comprising:
   providing a vehicle brake sensor ON/OFF status signal by a vehicle brake sensor of an aircraft ground refueling vehicle;
   providing a nozzle sensor ON/OFF status signal by a nozzle sensor of the aircraft refueling vehicle;
   providing a deadman fuel switch ON/OFF status signal by a deadman fuel switch of the aircraft refueling vehicle;
   receiving by a digital controller of the aircraft ground refueling vehicle the vehicle brake sensor ON/OFF status signal, the nozzle sensor ON/OFF status signal, and the deadman fuel switch ON/OFF status signal;

transmitting by digital controller of the aircraft ground refueling vehicle, a communication indicating the ON/OFF status of the vehicle brake sensor, the ON/OFF status of the nozzle sensor, and the ON/OFF status of the deadman fuel switch;

receiving by a computing system, in real-time from the digital controller of the aircraft ground refueling vehicle, the communication indicating the ON/OFF status of the vehicle brake sensor of the aircraft ground refueling vehicle, the ON/OFF status of the nozzle sensor of the aircraft refueling vehicle, and as the ON/OFF status of the deadman fuel switch of the aircraft refueling vehicle;

defining by the computing system a first ground refueling event time period as between a first start marker comprising an ON status of the vehicle brake sensor and a first end marker comprising a subsequent first instance of an ON status of the deadman fuel switch;

defining by the computing system a second ground refueling event time period as between a second start marker comprising the subsequent first instance of an ON status of the deadman fuel switch and second end marker comprising a subsequent last instance of an OFF status of the deadman fuel switch;

determining by the computing system a first amount of time spent in the first ground refueling event time period based on the first start marker and first end marker and creating a historical log of the first amount of time spent relative to the aircraft ground refueling vehicle;

determining by the computing system a second amount of time spent in the second ground refueling event time period based on the second start marker and second end marker and creating a historical log of the second amount of time spent relative to the aircraft ground refueling vehicle;

analyzing by the computing system the historical log of first and second amount of time spent to select at least one of the first and second ground refueling events as an event in which the amount of time should be reduced; and generating an output representative of the analysis by the computing system.

2. The method of claim 1, wherein the first amount of time comprises a set-up event to enable refueling of the aircraft.

3. The method of claim 1, wherein the second amount of time comprises a fueling event where fuel is delivered from the aircraft ground refueling vehicle to the aircraft.

4. The method of claim 1, wherein receiving the communication by the computing system includes receiving the communication at a mobile computing device proximate the aircraft ground refueling vehicle.

5. The method of claim 4, wherein the communication received at the mobile computing device is transmitted to a remote computing network.

6. The method of claim 1, wherein receiving the communication by the computing system includes directly receiving the communication at a remote computing network.

7. The method of claim 1, wherein the communication received by the computing system includes a location identifier of the of aircraft ground refueling vehicle.

8. The method of claim 1, further comprising:

defining by the computing system a third ground refueling event time period as between the subsequent last instance of an OFF status of the deadman fuel switch and a subsequent e-ticket acceptance, determining by the computing system a third amount of time spent in the third ground refueling event time period, and creating by the computing system a historical log of the third amount of time spent relative to the aircraft ground refueling vehicle.

9. The method of the claim 8, wherein the third amount of time is representative of a wait event.

10. The method of claim 1, further comprising:

defining by the computing system a fourth ground refueling event time period as between the subsequent e-ticket acceptance and a subsequent OFF status of the vehicle brake sensor, determining by the computing system a fourth amount of time spend in the fourth ground refueling event, and creating by the computing system a historical log of the fourth amount of time spent in the fourth ground refueling event time period, and creating by the computing system a historical log of the fourth amount of time spent relative to the aircraft ground refueling vehicle.

11. The method of claim 10, wherein the fourth amount of time is representative of a disconnect event.

12. A method of defining fueling events of an aircraft ground refueling operation, the method comprising:

providing a vehicle brake sensor ON/OFF status signal by a vehicle brake sensor of an aircraft ground refueling vehicle;

providing a nozzle sensor ON/OFF status signal by a nozzle sensor of the aircraft refueling vehicle;

providing a deadman fuel switch ON/OFF status signal by a deadman fuel switch of the aircraft refueling vehicle;

receiving by a digital controller of the aircraft ground refueling vehicle, the vehicle brake sensor ON/OFF status signal, the nozzle sensor ON/OFF status signal, and the deadman fuel switch ON/OFF status signal;

transmitting by digital controller of the aircraft ground refueling vehicle, a communication indicating the ON/OFF status of the vehicle brake sensor, the ON/OFF status of the nozzle sensor, and the ON/OFF status of the deadman fuel switch;

receiving by a computing system, in real-time from the digital controller of the aircraft ground refueling vehicle, the communication indicating the ON/OFF status of the vehicle brake sensor of the aircraft ground refueling vehicle, the ON/OFF status of the nozzle sensor of the aircraft refueling vehicle, and the ON/OFF status of the deadman fuel switch of the aircraft refueling vehicle;

defining by the computing system a set-up event time period of an aircraft ground refueling operation as between an ON status of the vehicle brake sensor and a subsequent first instance of an ON status of the deadman fuel switch;

defining by the computing system a fueling event time period of the aircraft ground refueling operation as between the subsequent first instance of the ON status of the deadman fuel switch and a subsequent instance of an OFF status of the deadman fuel switch;

defining by the computing system a wait event time period of the aircraft ground refueling operation as between the subsequent instance of the OFF status of the deadman fuel switch and an occurrence of an e-ticket acceptance;

defining by the computing system a disconnect event time period of the aircraft ground refueling operation as between the occurrence of the e-ticket acceptance and a subsequent instance of an OFF status of the vehicle brake sensor;

determining by the computing system a set-up, fueling, wait and disconnect amount of time elapsed in the respective set-up event time period, the fueling event time period, the wait event time period, and the disconnect time period;

creating by the computing system a historical log of the set-up, fueling, wait and disconnect amount of time elapsed relative to the aircraft ground refueling vehicle;

analyzing by the computing system the historical log set-up, fueling, wait and disconnect amount of time elapsed to select at least one set-up, fueling, wait and disconnect events as an event in which the amount of time should be reduced; and generating an output representative of the analysis by the computing system.

13. The method of claim 12, wherein receiving the communication by the computing system includes receiving the communication at a mobile computing device proximate the aircraft ground refueling vehicle.

14. The method of claim 12, wherein the communication received by the computing system includes a location identifier of the of aircraft ground refueling vehicle.

15. The method of claim 12, wherein the output by the computing system comprises at least one of a bar graph and pie chart.

16. An aircraft ground refueling system, comprising:
an aircraft ground refueling vehicle including a digital controller having a wireless transmitter, a vehicle brake sensor, a nozzle sensor, and a deadman fuel switch, wherein the digital controller is configured to receive a vehicle brake sensor ON/OFF status signal, a nozzle sensor ON/OFF status signal, and a deadman fuel switch ON/OFF status signal;
a computing system configured to:
receive in real time from the wireless transmitter of the digital controller of the aircraft ground refueling vehicle, a communication indicating the ON/OFF status of the vehicle brake sensor of the aircraft ground refueling vehicle, the ON/OFF status of the nozzle sensor of the aircraft refueling vehicle, and the ON/OFF status of the deadman fuel switch of the aircraft refueling vehicle;
define a first ground refueling event time period as between a first start marker comprising an ON status of the vehicle brake sensor and a first end marker comprising a subsequent first instance of an ON status of the deadman fuel switch;
define a second ground refueling event time period as between a second start marker comprising the subsequent first instance of an ON status of the deadman fuel switch and second end marker comprising a subsequent last instance of an OFF status of the deadman fuel switch;
determine a first amount of time spent in the first ground refueling event time period based on the first start marker and first end marker and creating a historical log of the first amount of time spent relative to the aircraft ground refueling vehicle;
determine a second amount of time spent in the second ground refueling event time period based on the second start marker and second end marker and creating a historical log of the second amount of time spent relative to the aircraft ground refueling vehicle;
analyze the historical log of first and second amount of time spent to select at least one of the first and second ground refueling events as an event in which the amount of time should be reduced; and
generate an output representative of the analysis.

17. The system of claim 16, wherein the wireless transmitter of the digital controller is configured to utilize one or both of far field and near field communication protocols to transmit the communication.

18. The system of claim 16, further comprising a remote transmitter located within the aircraft ground refueling vehicle remotely from the digital controller, wherein:
the computing system is external to the aircraft ground refueling vehicle; and
the remote transmitter is configured to receive a near field communication from the wireless transmitter of the digital controller, and to transmit the received communication to the computing system using a far field communication protocol.

19. The system of claim 16, wherein the computing system includes a mobile computing device located proximate the aircraft ground refueling vehicle.

20. The system of claim 19, wherein the computing system includes a computing network located remotely from the mobile computing device configured to execute an aircraft ground refueling management application, wherein the aircraft ground refueling management application is configured to communicate with the digital controller and the mobile computing device.

\* \* \* \* \*